United States Patent
Onyemauwa et al.

(10) Patent No.: US 10,130,918 B2
(45) Date of Patent: Nov. 20, 2018

(54) FLUOROPOLYMERS AND MEMBRANES COMPRISING FLUOROPOLYMERS (III)

(71) Applicant: Pall Corporation, Port Washington, NY (US)

(72) Inventors: Frank Okezie Onyemauwa, Pace, FL (US); Hassan Ait-Haddou, Melville, NY (US); Ying Labreche, Pensacola, FL (US)

(73) Assignee: Pall Corporation, Port Washington, NY (US)

( * ) Notice: Subject to any disclaimer, the term of this patent is extended or adjusted under 35 U.S.C. 154(b) by 48 days.

(21) Appl. No.: 15/267,652

(22) Filed: Sep. 16, 2016

(65) Prior Publication Data
US 2018/0078908 A1 Mar. 22, 2018

(51) Int. Cl.
*B01D 19/00* (2006.01)
*B01D 67/00* (2006.01)
*B01D 69/12* (2006.01)
*B01D 71/32* (2006.01)
*C08F 112/14* (2006.01)
*C08F 114/18* (2006.01)
*B01D 69/02* (2006.01)
*B01D 71/28* (2006.01)

(52) U.S. Cl.
CPC ......... *B01D 71/32* (2013.01); *B01D 19/0031* (2013.01); *B01D 67/0095* (2013.01); *B01D 69/02* (2013.01); *B01D 69/12* (2013.01); *B01D 71/28* (2013.01); *C08F 112/14* (2013.01); *C08F 114/185* (2013.01); *B01D 2323/08* (2013.01); *B01D 2325/38* (2013.01)

(58) Field of Classification Search
CPC .............. B01D 19/0031; B01D 53/228; B01D 67/0011; B01D 67/0013; B01D 67/0095; B01D 69/12; B01D 71/32; B01D 2323/08; B01D 2325/38; C08F 112/14; C08F 114/185
See application file for complete search history.

(56) References Cited

U.S. PATENT DOCUMENTS

| | | | | |
|---|---|---|---|---|
| 3,380,983 | A * | 4/1968 | Siegart | C08F 8/20 428/375 |
| 4,954,256 | A | 9/1990 | Degen et al. | |
| 5,834,523 | A * | 11/1998 | Steck | B01D 71/32 521/27 |
| 2002/0015874 | A1* | 2/2002 | Kim | B01D 71/76 429/494 |
| 2009/0277837 | A1* | 11/2009 | Liu | B01D 71/32 210/650 |
| 2013/0211026 | A1* | 8/2013 | Merlo | B01D 71/32 526/243 |
| 2014/0026756 | A1* | 1/2014 | Guo | B01D 53/228 96/10 |
| 2014/0260969 | A1* | 9/2014 | Richardson | B01D 19/0031 95/46 |
| 2015/0343392 | A1* | 12/2015 | Hikita | B01D 67/0006 521/134 |

FOREIGN PATENT DOCUMENTS

| | | |
|---|---|---|
| EP | 2963078 A1 | 1/2016 |
| JP | S63-097215 A | 4/1988 |
| JP | 2002-540928 A | 12/2002 |
| JP | 2009-245979 A2 | 10/2009 |
| JP | 2012-063194 A2 | 3/2012 |
| JP | 2015-071774 A2 | 4/2015 |
| JP | 2016-137455 A2 | 8/2016 |
| SG | 10201502131Q | 12/2015 |
| WO | WO 2009/137245 A2 | 11/2009 |
| WO | WO 2012/133538 A1 | 10/2012 |

OTHER PUBLICATIONS

Bouteiller, Veronique et al., "Synthesis, thermal and surface characterization of fluorinated polystyrenes", Polymer International, 48, 1999, pp. 765-772. (Year: 1999).*
European Patent Office, Extended European Search Report issued in European Application No. 17187921.6 (dated Dec. 12, 2017) 10 pp.
Andruzzi et al., "Engineering low surface energy polymers through molecular design: synthetic routes to fluorinated polystyrene-based block copolymers", Journal of Materials Chemistry, 12: 1684-1692 (2002).
Valade et al., "Random and Block Styrenic Copolymers Bearing Both Ammonium and Fluorinated Side-Groups", Polymer Chemistry, 49: 4668-4679 (2011).
Bouteiller et al., "Synthesis, thermal and surface characterization of fluorinated polystyrenes", Polymer International, vol. 48, pp. 765-772 (1999).
Boutevin et al., "Synthese D'Ethers et de Thioethers Allyliques Fluores par Catalyse par Transfert de Phase", Journal of Fluorine Chemistry, vol. 35, pp. 399-410 (1987).
Hoepken et al., "Low Surface Energy Polystyrene", Macromolecules, vol. 25, pp. 1461-1467 (1992).
Kim et al., "Comb-Like Fluorinated Polystyrenes Having Different Side Chain Interconnecting Groups", Macromolecules, vol. 42, pp. 3333-3339 (2009).

(Continued)

*Primary Examiner* — Jason M Greene
(74) *Attorney, Agent, or Firm* — Leydig, Voit & Mayer, Ltd.

(57) ABSTRACT

Disclosed are fluoropolymers with low CWST values and porous membranes made from the fluoropolymers. The fluoropolymer is made up of polymerized monomeric units of the formula A-X—$CH_2$—B, wherein A is $C_6F_{13}$—$(CH_2)_2$, X is O or S, and B is vinylphenyl, and the fluoropolymer has a weight average molecular weight (Mw) of at least 100 Kd and/or a glass transition temperature of at least 33° C. copolymer. The porous membranes are suitable for degassing a variety of fluids.

13 Claims, 1 Drawing Sheet

(56) References Cited

OTHER PUBLICATIONS

Kim et al., "Dispersion polymerization in supercritical carbon dioxide using comb-like fluorinated polymer surfactants having different backbone structures", *Journal of Supercritical Fluids*, vol. 55, pp. 381-385 (2010).
Shin et al., "Phase behavior of a ternary system of poly[p-perfluorooctyl-ethylene(oxy, thio, sulfonyl)methyl styrene] and poly[p-decyl(oxy, thio, sulfonyl)methyl styrene] in supercritical solvents", *Journal of Supercritical Fluids*, vol. 47, pp. 1-7 (2008).
Steele et al., "Linear abrasion of a titanium superhydrophobic surface prepared by ultrafast laser microtexturing", *Journal of Micromechanics and Microengineering*, vol. 23, No. 11 (Abstract only), 2013.
Intellectual Property Office of Singapore, Search Report issued in Singapore Application No. 10201706549W (dated Jan. 31, 2018) 3 pp.
Ishihara et al., "Polymerization ability of perfluoroalkyloxy group-substituted styrene derivatives and their surface characteristics", *Kobunshi Ronbunshu*, 45(8): 653-659 (1988).
Taiwan Intellectual Property Office, Office Action issued in Taiwanese Application No. 106126566 (dated May 21, 2018) 4 pp.
Korean Intellectual Property Office, Office Action issued in Korean Application No. 10-2017-0111853 (dated Jul. 16, 2018) 12 pp.
U.S. Appl. No. 15/237,172, filed Aug. 15, 2016.
U.S. Appl. No. 15/237,192, filed Aug. 15, 2016.
Japan Patent Office, Notice of Reasons for Rejection issued in Japanese Application No. 2017-154355 (dated Sep. 4, 2018) 11 pp.
Couture et al., "Polymeric materials as anion-exchange membranes for alkaline fuel cells," *Progress in Polymer Science*, 36: 1521-1557 (2011).

* cited by examiner

FLUOROPOLYMERS AND MEMBRANES COMPRISING FLUOROPOLYMERS (III)

BACKGROUND OF THE INVENTION

Membranes comprising fluoropolymers are being considered for filtering a variety of fluids, for example, for removing gases dispersed in fluids. Some of these membranes are characterized by low surface energy values or critical wetting surface tension (CWST) values and/or high resistance to organic solvents and aggressive chemicals. Despite the one or more of the advantages of these membranes, there exists a need for fluoropolymers and membranes comprising such fluoropolymers with improved properties such as low CWST values and/or increased resistance to organic solvents and/or aggressive chemicals.

BRIEF SUMMARY OF THE INVENTION

The invention provides fluoropolymers with low CWST values and membranes made from the fluoropolymers. In an embodiment, the invention provides a fluoropolymer comprising polymerized monomeric units of the formula A-X—$CH_2$—B, wherein A is $C_6F_{13}$—$(CH_2)_2$, X is O or S, and B is vinylphenyl, and the fluoropolymer has a weight average molecular weight (Mw) of at least 100 Kd and/or a glass transition temperature of at least 33° C. copolymer.

The fluoropolymer is a superhydrophobic polymer and can be used to impart oleophobic properties, i.e., a CWST of as low as 15 dynes/cm, to material surfaces. The invention also provides a method of preparing a porous membrane comprising the copolymer disposed on a porous support. The invention further provides a method of degassing fluids, particularly fluids containing gases dissolved or dispersed therein. For example, the porous membranes are suitable for removing gaseous impurities present in fluids at a concentration below 1 ppb, or below the detection limit of most instruments.

The fluoropolymer membrane of the invention has one or more of the following advantages: oleophobic membranes with surface tensions of 15-23 dynes/cm are produced from a one-step coating process without post treatment of the membranes. Oleophobic membranes produced from this process are stable to acid, bases, oxidizers, and/or heat. Oleophobic membranes retain at least 80% of their porosity. The membranes are stable to withstand vacuum holds of 15 mmHg, e.g., for 15 hours or more. Polymer concentrations as low as 0.25% are able to produce oleophobic membranes with a surface tension value of 23 dynes/cm. The polymer coating is adaptable to coat on many, if not all, porous support membranes and thin films. It does not require extensive investment in equipment to cast membranes since the method uses already existing machinery with little or no modifications. The invention provides a homopolymer that when coated on a membrane has a surface tension 23 dynes or less without post treatment of the membrane. The membrane is porous with high water breakthrough pressure and/or high air flow rate.

DETAILED DESCRIPTION OF THE INVENTION

Figures 1A, 1B:
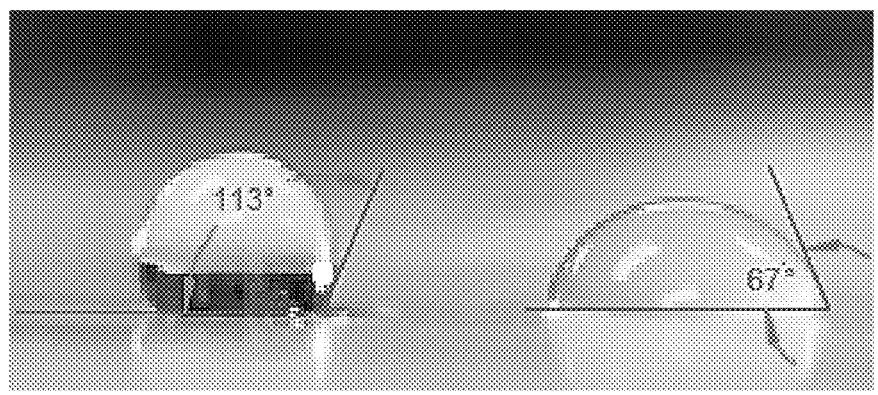
FIG. 1A depicts the contact angle of a drop of water on a fluoropolymer membrane in accordance with an embodiment of the invention.
FIG. 1B depicts the contact angle of a drop of IPA on a fluoropolymer membrane in accordance with an embodiment of the invention.

In accordance with an embodiment, the invention provides a fluoropolymer comprising polymerized monomeric units of the formula

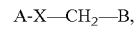

wherein A is $C_6F_{13}$—$(CH_2)_2$, X is O or S, and B is vinylphenyl, and the fluoropolymer has a weight average molecular weight (Mw) of at least about 100 Kd and/or a glass transition temperature of at least about 33° C. copolymer.

In accordance with the invention, B is meta-vinylphenyl, para-vinylphenyl, or a mixture thereof. For example, the fluoropolymer comprises meta-[perfluorohexylethylenethiomethyl] styrene, para-[perfluorohexylethylenethiomethyl] styrene, or a mixture thereof, as monomeric unit(s). In a further example, the fluoropolymer comprises meta-[perfluorohexylethyleneoxymethyl] styrene, para-[perfluorohexylethyleneoxymethyl] styrene, or a mixture thereof.

In an embodiment, the fluoropolymer has an Mw of at least about 100 Kd, at least about 400 Kd, at least about 600 Kd, at least about 800 Kd, or at least about 1000 Kd. For example, the fluoropolymer has an Mw of about 100 to about 4000 Kd, preferably about 500 to about 1500 Kd, and more preferably about 1100 to about 1300 Kd.

In an embodiment, the fluoropolymer has a number average molecular weight (Mn) of at least about 60 Kd, at least about 200 Kd, at least about 400 Kd, at least about 600 Kd, or at least about 1000 Kd. For example, the fluoropolymer has an Mn of about 100 to about 2000 Kd, preferably about 200 to about 1500 Kd, and more preferably about 400 to about 1400 Kd, and in another embodiment, about 60 to about 1200 Kd.

In any of the above embodiments, the fluoropolymer has a polydispersity index (Mw/Mn) of about 1.5 to about 5, about 1.5 to about 4, or about 1.5 to about 3.

In a particular embodiment, the fluoropolymer has an Mw of at least about 98 Kd.

The monomer can be prepared by reacting $C_6F_{13}$—$(CH_2)_2$—Y, wherein Y is SH or OH, with a haloalkyl styrene.

The fluoropolymer can be prepared from the monomer by any suitable method. For example, free radical polymerization can be used, particularly by the use of an initiator in combination with a radical stabilizer. In an embodiment, the fluoropolymer can be prepared by the self-initiated thermal polymerization of the monomer at a temperature of about 130° C. to about 180° C.

In accordance with an embodiment, the use of (2,2,6,6-tetramethylpiperidin-1-yl)oxyl (TEMPO) for the polymerization allows a slow growth rate of the polymer chain and a recombination of the shorter chains resulting in a polymer with narrow molecular weight distributions.

The monomers are synthesized from perfluorohexyl ethyl thiol, perfluorohexyl ethyl alcohol or their eight carbon fluorinated analogue and chloromethylstyrene, by a special process disclosed herein. The process disclosed herein simplifies the synthesis and purification of the monomer and polymer, making it available for industrial application.

A preferred method to synthesize the monomer and subsequent polymer is as follows: A 263 mmol of the fluorinated thiol is mixed with 238 mmol equivalent of chloromethyl-styrene with 100 mL of DMF and 33 mL of 8 M sodium hydroxide in a 500 mL round bottom flask. The reaction mixture is stirred at room temperature for 1 hour and separated in a reparatory funnel. The resulting product is distilled at 140° C. at 2 mbar, e.g., with 85% yield.

The fluoropolymers are soluble in halogenated solvents like chloroform; dichloromethane; 1,2-dichloroethane; 1,1,1,3,3,3-hexafluoro-2-propanol; 1,1,2-trichloro-1,2,2-trifluoroethane and 1,1,1,2,2-pentafluoro-3,3-dichloropropane. However, some of these solvents may be toxic or may not provide the optimal CWST values.

Examples of suitable solvents include methoxybutanes such as $(CF_3)_2CF-CF_2OCH_3$, $CF_3CF_2CF_2CF_2OCH_3$, or mixtures thereof, by themselves or in combination with isopropanol (IPA). Such solvents are environmentally friendly. Some of these are commercially available as engineered solvents, e.g., Novec 7100™ (methoxy-nanofluorobutanes) or Novec™ 71IPA methoxy-nanofluorobutanes in combination with IPA, which are environmentally friendly and less hazardous, and are preferred.

The use of fluorinated solvents or engineered solvents improves the adhesion of the fluoropolymer to the porous support.

The present invention further provides a porous membrane comprising a fluoropolymer described above, wherein the porous membrane is free standing or is disposed on a porous support, e.g., a porous polymeric support.

In an embodiment, the porous polymeric support is selected from PVC/PAN, polysulfone, polyamide, cellulose, polyester, polyethersulfone, polyolefin, e.g., polypropylene or polyethylene, in particular HDPE, PET, PPS, PPSU (polyphenyl sulfone), PTFE, PVDF, PVF (polyvinyl fluoride), PCTFE (polychlorotrifluoroethylene), FEP (fluorinated ethylene-propylene), ETFE (polyethylenetetrafluoroethylene), ECTFE (poly ethylenechlorotrifluoroethylene), PFPE (perfluoropolyether), PFSA (perfluorosulfonic acid), perfluoropolyoxetane, polyimide, polyether imide, polycarbonate, and polystyrene.

The porous membrane is oleophobic, and in an embodiment, with a CWST of about 23 dynes/cm or less, e.g., 15-23 dynes/cm, in particular, 15, 16, 17, 18, 19, 20, 21, 22, and 23 dynes/cm.

The porous membrane can be prepared in situ by polymerizing the monomer on a porous support, e.g., by a polymerizing radiation such as UV or e-beam. Alternatively, and preferably, the porous membrane is prepared by coating a porous support with a solution of the fluoropolymer.

The CWST of the membrane can be measured by any suitable method. In an embodiment, the method relies on a set of solutions of certain composition. Each solution has specific surface tension. The solutions' surface tension values range from 15 to 92 dyne/cm in small non-equivalent increments. To measure the surface tension, the membrane is positioned on top of a white light table, one drop of a solution of certain surface tension is applied to the porous membrane surface and the time the drop takes to penetrate the porous membrane and become bright white, an indication of light going through the porous membrane, is recorded. It is considered instant wetting when the time the drop takes to penetrate the porous membrane is ≤10 seconds. The solution that gives instant wetting defines the CWST of the porous membrane. If the time>10 seconds, the solution is considered to partially wet the porous membrane.

In accordance with an embodiment of the invention, the porous membrane is a porous membrane, e.g., a nanoporous membrane, for example, a porous membrane having pores of diameter between 1 nm and 100 nm, or a microporous membrane having pores of diameter between 1 μm and 10 μm.

Aspects of the invention include, but are not limited to:

a) Porous oleophobic membranes derived from a one-step surface coating with the polymers poly[p/m-[[(perfluorohexylethylene)thio]methyl]-styrene and poly[p/m-[[(perfluorohexylethylene)oxy]methyl]-styrene, and with surface tensions between 15 and 23 dynes/cm;

b) Porous oleophobic membranes with surface tensions between 15 and 23 dynes/cm derived from a surface coating with the monomers perfluorohexylethylenethiomethyl styrene, and perfluorohexylethyleneoxymethyl styrene, and subsequently irradiated with E-beam energy to obtain oleophobic surfaces;

c) Porous oleophobic membranes derived from one-step surface coating with the polymers poly[p/m-[[(perfluorohexylethylene)thio]methyl]-styrene and poly[p/m-[[(perfluorohexylethylene)oxy]methyl]-styrene, and with surface tensions between 15 and 23 dynes/cm, and with post coating drying temperature ranging from 20° to 150° C.; and d) A modified method that simplifies the synthesis of perfluorohexylethylenethiomethyl styrene and the subsequent synthesis of poly[p/m-[[(perfluorohexylethylene)thio]methyl]-styrene for preparing porous membranes useful in commercial and industrial applications.

Figures 2A, 2B:
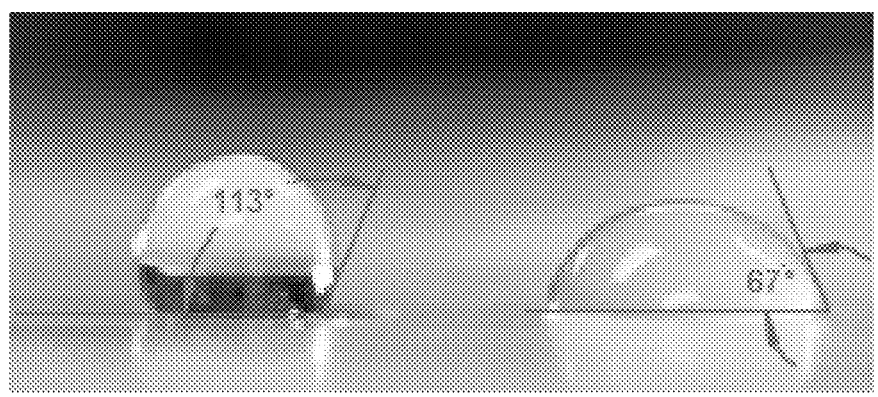
FIG. 2A depicts the contact angle of a drop of water on a fluoropolymer membrane in accordance with an embodiment of the invention.
FIG. 2B depicts the contact angle of a drop of IPA on a fluoropolymer membrane in accordance with an embodiment of the invention.

The porous membrane can comprise the fluoropolymer in one of many ways. For example, the porous membrane may include a coating comprising the copolymer. The porous membrane can be prepared by dissolving 2% polymer in a suitable solvent, e.g., acetone, and a porous support, such as PTFE, is dipped in the polymer solution for 2 seconds. The coated support is dried in an oven at 80° C. for 20 minutes, and the product is soaked in IPA for 2 hours, dried in an oven for 30 minutes at 80° C. to obtain the porous membrane. SEM micrographs of the surface of a PTFE support and a porous membrane coated on the support are depicted in FIG. 1-2, respectively.

Membranes can be spin coated, drip coated, spray coated, dip coated or print coated. The coating can also be carried out without additionally drying with heat. The additional heating, however, is preferred since, for example, it can improve the robustness of the membrane. It is able to withstand negative pressures, e.g., up to 15 mm Hg.

In accordance with embodiments of the invention, the porous membrane can have a variety of configurations, including planar, flat sheet, pleated, tubular, spiral, and hollow fiber. In one embodiment, the porous membrane is a hollow-fiber membrane.

Porous membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive membrane or filter comprising at least one inventive membrane is disposed in a housing comprising at least one inlet and at least two outlets and defining at least a first fluid flow path between the inlet and the first outlet, and a second fluid flow path between the inlet and the second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonate resin.

The porous membranes according to embodiments of the invention can be used to filter air and/or gas and/or can be used for venting applications (e.g., allowing air and/or gas, but not liquid, to pass therethrough).

The porous membrane, according to embodiments of the invention, can also be used in a variety of applications, including, for example, diagnostic applications (including, for example, sample preparation and/or diagnostic lateral flow devices), ink jet applications, lithography, e.g., as replacement for HD/UHMW PE based media, filtering fluids for the pharmaceutical industry, metal removal, production of ultrapure water, treatment of industrial and surface waters, filtering fluids for medical applications (including for home and/or for patient use, e.g., intravenous applications, also including, for example, filtering biological fluids such as blood (e.g., virus removal)), filtering fluids for the electronics industry (e.g., filtering photoresist fluids in the microelectronics industry and hot SPM), filtering fluids for the food and beverage industry, beer filtration, clarification, filtering antibody- and/or protein-containing fluids, filtering nucleic acid-containing fluids, cell detection (including in situ), cell harvesting, and/or filtering cell culture fluids. Porous membranes according to embodiments of the inventions can be used in a variety of devices, including surgical devices and products, such as, for example, ophthalmic surgical products. An example of a degassing application is degassing of intravenous (IV) fluids. If IV fluids are not degassed properly before injection, it can introduce air embolus into the circulatory system, which can be fatal under circumstances.

One preferred use of this invention is for coating of the porous membranes for venting applications in the biopharma and medical industry. Alternatively, the oleophobic coating can be used for anti-icing or for ice-phobic surfaces, and can be coated on fiber glass, metal and aluminum surfaces, power lines, boat hulls and airplane wings.

Non-porous films can be coated using the polymers poly[p/m-[[(perfluorohexylethylene)thio]methyl]-styrene and poly[p/m-[[(perfluorohexylethylene)oxy]methyl]-styrene and their higher carbon fluorinated analogues to achieve oleophobic surfaces with high surface energy. Coating can be done by spin coating, drip coating, spray coating, dip coating or print coating.

The following examples further illustrate the invention but, of course, should not be construed as in any way limiting its scope.

EXAMPLE 1

This example illustrates the preparation of a monomer in accordance with an embodiment of the invention.

Preparation of p-[[perfluorohexylethylene)thio]methyl]-Styrene PFOMS): 2-perfluorohexyl ethyl thiol (1000 g, 2.63 M) was dissolved in DMF (1 L) in a 3 L reactor, and aqueous 8 M NaOH (330 mL) was added at 350 rpm (exothermic), followed by the addition of vinyl benzyl chloride (364 g, 2.39 M). The reaction mixture was stirred at 80° C. for 15 hours. After cooling down, the resulting mixture was separated using a 2 L separatory funnel (the product is denser). The H$_2$O/DMF layer was further extracted with hexane (600 mL) The combined organic layers were washed with 7% aqueous sodium bicarbonate, and sodium bicarbonate layer re-extracted with hexane (300 mL). The thus obtained product was further washed with saturated sodium chloride (1 L), and dried with anhydrous sodium sulfate. The product was filtered through silica gel (750 g in hexane), and eluted with hexane (3 L). After concentration, the final product obtained weighed (1.115 kg, 2.25 M, 86% yield). $^1$H NMR (CDCl$_3$ in ppm): δ 2.25 (m, 2H), 2.60 (d, 2H), 3.70 (s, 2H), 5.25 (d, 1H), 5.75 (d, 1H), 6.69 (dd, 1H), 7.25 (d, 2H), 7.40 (d, 2H).

EXAMPLE 2

This example illustrates the preparation of a fluoropolymer, poly[p-[[(perfluorohexylethylene)thio]methyl] styrene] (PST-S), in accordance with an embodiment of the invention.

p-[[(perfluorohexylethylene)thio]methyl]-styrene (1.115 kg, 2.25 M) in a 2 L Flask was mixed with toluene (350 g) and azobisisobutyronitrile ((AIBN) 11 g, 674 mmol, 3 mol %)), and degassed with nitrogen gas at 0° C. for 45 minutes. The reaction mixture was stirred at 60° C. for 14 hours. The resulting product was precipitated slowly in methanol (9 L) over 2 hours, and mixed for additional 1 hour. The solvent was decanted and the product was re-dissolved in chloroform (2 L), and reprecipitated in fresh methanol (15 L). After 5 hours of mixing, the product was filtered through a frittered funnel or filter paper using house vacuum, and rinsed with methanol (500 mL). The product was allowed to dry under house vacuum for 1 hour, and in a vacuum oven overnight or until completely dry at 30° C. The polymer obtained weighed 912 g, 82% yield by weight of the monomer.

EXAMPLE 3

This example illustrates the preparation of another fluoropolymer, poly[p-[[(perfluorohexylethylene)oxy]methyl]-styrene] P(PFOMS), in accordance with an embodiment of the invention.

The monomer PFOMS (15.2 g, 31.7 mmol) was taken into a 250 mL round-bottomed flask with 2,2'-Azobis(2-methylpropionitrile) (AIBN) (207.7 mg, 1.23 mmol) and tetrahydrofuran (THF) (7.5 g, 104 mmol). After stirring at 60° C. for 12 h, the reaction mixture was poured into methanol, and the precipitate obtained was purified by several precipitations from solvent Novec™ 71IPA into methanol. Yield: 85%.

Table 1 lists the glass transition temperatures (Tg) of the homopolymers.

TABLE 1

Glass transition temperatures of the fluorinated polymers
Glass Transition Temperature of Homopolymers

| Polymer | Tg1, ° C. |
| --- | --- |
| P(PFOMS) | 40 |
| P(PFOTMS) | 33 |

EXAMPLE 4

This example illustrates a coating procedure in accordance with an embodiment of the invention.

Melt blown polyester backed PTFE and non supported PTFE membranes 20 nm, 0.1 µm, 0.2 µm, 0.45 µm, or 1 µm were cut into 5 inch×5 inch sheets. Several sheets of membranes were placed into a stainless steel tray. The coating solution with the polymer concentration of 0.5, 0.75, 1.0, 1.5, 2.0, 2.5 or 3.0% in chloroform, Novec™ 71IPA, or Novec™ 7100 was poured into the tray and gently shaken to make sure the membranes were thoroughly soaked by the coating solution. The membrane samples were removed from the soaking solution and dried in an oven at 80° C. for 20 min, followed by testing for membrane performance. Table 2 below shows test results from a 0.2 µm polyester backed PTFE membrane.

EXAMPLE 5

This example illustrates the preparation of an oleophilic membrane in accordance with an embodiment of the invention.

Polyester backed polyethersulfone (PES) and non-supported PES membranes having pores of 0.1 µm, 0.2 µm, 0.45 µm, 1 µm or 5 µm diameter were cut into 5 inch×5 inch sheets. Several sheets of such membranes were placed in a stainless steel tray. The coating solution with polymer concentration of 0.5, 0.75, 1.0, 1.5, 1.75, 2.0, 2.25, 2.5 or 3.0% in Novec™ 71IPA, or Novec™ 7100 was poured into the tray and gently shaken to ensure the membranes were thoroughly soaked by the coating solution. The membrane samples were removed from the soaking solution and dried in an oven at 70° C., 80° C., 90° C., 100° C., 120° C., or 140° C. for 20 min. Tables 2-4 below set forth the testing results from such membrane at 70° C. and at 120° C.

EXAMPLE 6

This example illustrates the preparation of oleophilic membranes from PVDF and Nylon membranes in accordance with an embodiment of the invention.

Polyester backed PVDF and non-supported Nylon membranes or cellulose depth sheets, 0.2 µm, 0.45 µm, 1 µm or 5 µm pore diameter were cut into 5 inch×5 inch sheets. Several sheets of membranes were placed in a stainless steel tray. The coating solution with polymer concentration of 0.5, 0.75, 1.0, 1.5, 2.0, 2.5 or 3.0% in Novec™ 71IPA, or Novec™ 7100 was poured into the tray and gently shaken to make sure the membranes were thoroughly soaked by the coating solution. The membrane samples were removed from the soaking solution and dried in an oven at 70° C., 80° C., 90° C. 100° C., 120° C., or 140° C. for 20 min. Table 5 below sets forth the testing results from such membranes at 70° C.

EXAMPLE 7

This example illustrates the preparation of oleophilic membranes from Nylon, HDPE and PTFE membranes in accordance with an embodiment of the invention.

Nylon membranes 5 nm, PTFE membranes 5 nm and 10 nm, and HDPE membranes 5 nm and 10 nm pore diameter were cut into 5 inch×5 inch sheets. Several sheets of membranes were placed in a stainless steel tray. The coating solution with a polymer concentration of 0.4% in Novec™ 7100 was poured into the tray and gently shaken for 10 seconds. The membrane samples were removed from the soaking solution and dried in an oven at 130° C. for 20 min.

TABLE 2

Air Flow Rates, Water Break through pressure (psi), and CWST values
Poly(pfotms) coated PTFE Membranes

| | 1.2 µm supported | 0.2 µm supported | 0.2 µm unsupported | 20 nm unsupported | 0.2 µm control | 1.2 µm control |
| --- | --- | --- | --- | --- | --- | --- |
| AFR at 13.5 PSI | 107 | 23.8 | NA | | 26 | >201 |
| WBT | 8.4 | 21.62 | | | 50 | 10.9 |
| CWST (dynes/cm) | 21.62 | 21.62 | 20.14 | 20.14 | 26 | 26 |

TABLE 3

Air Flow Rates, Water Break Through pressure (psi), and CWST values
Poly(pfotms) coated 0.2 μm PES membrane

| | Polyester supported 0.2 μm PES Membrane | | | | Unsupported PES | |
|---|---|---|---|---|---|---|
| | 1% conc. @ 70 C. Dry | 1% conc. @ 120 C. Dry | 0.75% Conc. @ 70 C. Dry | 0.75% conc. @ 120 C. Dry | Coated unsupported 0.2 μm PES | Uncoated Control 0.2 μm PES |
| AF | | 12 | 9.75 | 9.75 | 9.2 | 20 |
| WBT | | 45.32 | 46.84 | 46.8 | NA | NA |
| CWST (dynes/cm) | 21.62 | 21.62 | 21.62 | 21.62 | 20.14 | 85 |

TABLE 4

Air Flow Rates, Water Break Through pressure (psi), and CWST values
Poly(pfotms) coated 0.2 μm PES membrane

| | Polyester supported 0.2 μm PES Membrane | | | | Unsupported PES | |
|---|---|---|---|---|---|---|
| | 1% conc. @ 70 C. Dry | 1% conc. @ 120 C. Dry | 0.75% Conc. @ 70 C. Dry | 0.75% conc. @ 120 C. Dry | Coated unsupported 0.2 μm PES | Uncoated Control 0.2 μm PES |
| AF | | 12 | 9.75 | 9.75 | 9.2 | 20 |
| WBT | | 45.32 | 46.84 | 46.8 | NA | NA |
| CWST (dynes/cm) | 21.62 | 21.62 | 21.62 | 21.62 | 20.14 | 85 |

TABLE 5

Air Flow Rates, Water Break Through pressure (psi), and CWST values
Poly(pfoms) coated PES Membrane

| | 1% conc. On unsupported 0.2 μm PES | 1% conc. On Supported 0.2 μm PES | 1.5% conc. On unsupported 0.8 μm PES |
|---|---|---|---|
| AFR @ 13.2 | 12 | 12 | NA |
| WBT | NA | 46.04 | NA |
| CWST (dynes/cm) | 21.62 | 21.62 | 21.62 |

TABLE 6

Air Flow Rates, Water Break Through pressure (psi), and CWST values
Poly(pfotms) coated PVDF and Nylon

| Sample | CWST | AFR @ 13.5 PSI | WBT |
|---|---|---|---|
| PVDF membrane 3 μm control | 85 | 187 | 1.78 |
| PVDF membrane 3 μm | 20.14 | 201 | 1.36 |
| PVDF membrane 0.2 μm control | 45 | 8.1 | 23.5 |
| PVDF membrane 0.2 μm | 21.62 | 8.3 | 29.16 |
| Biodyne B (Nylon) 0.2 μm | 21.62 | 15.25 | 35.68 |
| Biodyne B control 0.2 μm | 85 | 21.4 | 3.62 |
| Biodyne A (Nylon) 0.2 μm | 20.14 | 6.8 | 1.22 |
| Biodyne A control 0.2 μm | 85 | 10.75 | 1.26 |

TABLE 7

E-beam results from polymerization of
p-[[(Perfluorohexylethylene)thio]methyl]-Styrene monomer
on polyether sulfone and polytetrafluoroethylene membranes
E-Beam polymerization on Membrane using
p-[[(Perfluorohexylethylene)thio]methyl]-Styrene monomer

| Sample | Base membrane | Formulation | CWST dynes/cm | AF (5 psi) 1 | AF (5 psi) 2 | WBT 1 | WBT 2 |
|---|---|---|---|---|---|---|---|
| Control | 0.2 μm MBM backed PTFE | NA | 26 | 36 | 36 | 50 | 50 |
| AC | 0.2 μm MBM backed PTFE | 3% PFOTMS | 20.14 | 2.5 (13.5 psi) | 2.5 (13.5 psi) | 12.72 | 11.48 |
| Control | Supor 200 (PES) | NA | 85 | 22.5 | 22.5 | NA | NA |
| Sample | Supor 200 (PES) | 3% PFOTMS | 23.83 | 5.0 | 5.5 | 8.26 | 12.12 |

TABLE 7-continued

E-beam results from polymerization of
p-[[(Perfluorohexylethylene)thio]methyl]-Styrene monomer
on polyether sulfone and polytetrafluoroethylene membranes
E-Beam polymerization on Membrane using
p-[[(Perfluorohexylethylene)thio]methyl]-Styrene monomer

| Sample | Base membrane | CWST dynes/cm Formulation | AF (5 psi) 1 | 2 | WBT 1 | 2 |
|---|---|---|---|---|---|---|
| Sample | Supor 200 (PES) | 7% PFOTMS 23.85 | 3.5 | 3.5 | 12.56 | 11.80 |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A porous membrane comprising a porous polymeric support and a fluoropolymer, wherein the fluoropolymer comprises polymerized monomeric units of the formula

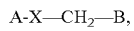

wherein A is $C_6F_{13}$—$(CH_2)_2$, X is O or S, and B is vinylphenyl, and the fluoropolymer has a weight average molecular weight (Mw) of at least 100 Kd and/or a glass transition temperature of at least 33° C.,
wherein the porous polymeric support is selected from PVC/PAN, polysulfone, polyamide, cellulose, polyester, PPS, PPSU (polyphenyl sulfone), PVDF, PVF (polyvinyl fluoride), FEP (fluorinated ethylene-propylene), ETFE (polyethylenetetrafluoroethylene), PFPE (perfluoropolyether), PFSA (perfluorosulfonic acid), perfluoropolyoxetane, polyimide, polyether imide, polycarbonate, and polystyrene, and
wherein the porous membrane has a CWST of 15 to 23 dynes/cm.

2. The porous membrane of claim 1, wherein B is meta-vinylphenyl, para-vinylphenyl, or a mixture thereof.

3. The porous membrane of claim 1, wherein the monomeric unit is meta-[perfluorohexylethylenethiomethyl] styrene, para-[perfluorohexylethylenethiomethyl] styrene, or a mixture thereof.

4. The porous membrane of claim 1, wherein the monomeric unit is meta-[perfluorohexylethyleneoxymethyl] styrene, para-[perfluorohexylethyleneoxymethyl] styrene, or a mixture thereof.

5. The porous membrane of claim 1, wherein the fluoropolymer has a an Mw of at least 200 Kd.

6. The porous membrane of claim 1, wherein the fluoropolymer has an Mw of 400 to 1300 Kd.

7. The porous membrane of claim 1, wherein the fluoropolymer has an Mw of 1100 to 1300 Kd.

8. The porous membrane of claim 1, wherein the porous polymeric support is selected from PVC/PAN, polysulfone, polyamide, cellulose, polyethersulfone, PPS, PPSU (polyphenyl sulfone), PFPE (perfluoropolyether), PFSA (perfluorosulfonic acid), perfluoropolyoxetane, polyimide, polyether imide, and polycarbonate.

9. A method of preparing a porous membrane according to claim 1, the method comprising:
(i) dissolving the fluoropolymer in a solvent or mixture of solvents to obtain a solution comprising the fluoropolymer;
(ii) coating the solution from (i) on the porous polymeric support; and
(iii) evaporating the solvent or mixture of solvents from the coating to obtain the porous membrane.

10. The method of claim 9, wherein the solvent or mixture of solvents comprises a halogenated solvent, optionally in combination with an alcohol.

11. The method of claim 10, wherein the solvent or mixture of solvents is selected from methoxy nona-fluorobutane, methoxy nona-fluorobutane, chloroform, dichloromethane, 1,2-dichloroethane; 1,1,2-trichloro-1,2,2-trifluoroethane, 1,1,1,2,2-pentafluoro-3,3-dichloropropane, optionally in combination with isopropanol and/or 1,1,1,3,3,3-hexafluoro-2-propanol.

12. A method of filtering a fluid, the method comprising passing the fluid through the porous membrane of claim 1.

13. The method of claim 12, wherein a gas present in the fluid is removed from the fluid.

* * * * *